United States Patent
Mishima

(10) Patent No.: US 11,881,004 B2
(45) Date of Patent: Jan. 23, 2024

(54) CONVOY VEHICLE DETERMINATION DEVICE AND VEHICLE

(71) Applicant: Isuzu Motors Limited, Tokyo (JP)

(72) Inventor: Yasuyuki Mishima, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 506 days.

(21) Appl. No.: 17/271,662

(22) PCT Filed: Aug. 30, 2019

(86) PCT No.: PCT/JP2019/034295
§ 371 (c)(1),
(2) Date: Feb. 26, 2021

(87) PCT Pub. No.: WO2020/045673
PCT Pub. Date: Mar. 5, 2020

(65) Prior Publication Data
US 2021/0342607 A1    Nov. 4, 2021

(30) Foreign Application Priority Data
Aug. 31, 2018  (JP) ................................ 2018-163384

(51) Int. Cl.
*G06V 20/58*   (2022.01)
*H04W 4/46*   (2018.01)
(Continued)

(52) U.S. Cl.
CPC ............ *G06V 20/584* (2022.01); *B60K 35/00* (2013.01); *G08G 1/20* (2013.01); *G08G 1/22* (2013.01);
(Continued)

(58) Field of Classification Search
CPC ............... G06V 20/584; G06V 20/625; G06V 2201/08; B60K 35/00; B60K 2370/797;
(Continued)

(56) References Cited

U.S. PATENT DOCUMENTS

| 9,940,840 | B1 * | 4/2018 | Schubert | ............ G01C 21/3407 |
| 2017/0293296 | A1 * | 10/2017 | Stenneth | .......... G06Q 10/06315 |

(Continued)

FOREIGN PATENT DOCUMENTS

| CN | 104102978 | 10/2014 |
| JP | 2003-200827 | 7/2003 |

(Continued)

OTHER PUBLICATIONS

International Search Report and the Written Opinion dated Oct. 1, 2019 From the International Searching Authority Re. Application No. PCT/JP2019/034295 and Its Translation of Search Report Into English. (8 Pages).

*Primary Examiner* — Brandon J Miller

(57) ABSTRACT

This convoy vehicle determination device can improve determination accuracy of a vehicle for forming a convoy. This convoy vehicle determination device, which determines convoy vehicle candidates, is provided with: an acquisition unit which acquires identification information of a third vehicle positioned in the periphery of any second vehicle from among the peripheral vehicles, read by the second vehicle, and, from the second vehicle, acquires position information of the second vehicle with respect to the third vehicle, specified by the second vehicle; and a determination unit which compares the identification information of the first vehicle and identification information of the third vehicle, and, on the basis of the results of said comparison and the position information of the second vehicle with respect to the third vehicle, determines a second vehicle from among the peripheral vehicles located in the periphery of the first vehicle as a convoy vehicle candidate.

6 Claims, 3 Drawing Sheets

FORWARD ◄─────► REARWARD

(51) Int. Cl.
*B60K 35/00* (2006.01)
*G08G 1/00* (2006.01)
*G06V 20/62* (2022.01)

(52) U.S. Cl.
CPC ......... *H04W 4/46* (2018.02); *B60K 2370/797* (2019.05); *G06V 20/625* (2022.01); *G06V 2201/08* (2022.01)

(58) Field of Classification Search
CPC ............ G08G 1/20; G08G 1/22; G08G 1/202; H04W 4/46
See application file for complete search history.

(56) References Cited

U.S. PATENT DOCUMENTS

| | | | | |
|---|---|---|---|---|
| 2017/0344023 | A1* | 11/2017 | Laubinger | G08G 1/22 |
| 2018/0307247 | A1* | 10/2018 | Taniguchi | G08G 1/22 |
| 2019/0171227 | A1* | 6/2019 | Sujan | G05D 1/0295 |

FOREIGN PATENT DOCUMENTS

| | | | | |
|---|---|---|---|---|
| JP | 2010-086269 | | 4/2010 | |
| JP | 2013-131065 | | 7/2013 | |
| JP | 2013-196664 | | 9/2013 | |
| JP | 2014-1 53950 | | 8/2014 | |
| JP | 2015-087969 | | 5/2015 | |
| JP | 2016-146131 | | 8/2016 | |
| JP | 2018-060448 | | 4/2018 | |
| WO | WO-2017200433 | A1* | 11/2017 | G08G 1/16 |
| WO | WO 2018/153296 | | 8/2018 | |
| WO | WO 2020/045673 | | 3/2020 | |

* cited by examiner

CONVOY VEHICLE DETERMINATION DEVICE AND VEHICLE

TECHNICAL FIELD

The present disclosure relates to a platoon vehicle discrimination apparatus and a vehicle.

BACKGROUND ART

In the related art, as a system configured to discriminate a platoon vehicle to be organized into a platoon with a first vehicle, a system is known (see, for example, PTL 1) that includes a detection section configured to detect identification information of a forward vehicle travelling ahead of the first vehicle, and a communication section configured to receive identification information of a platoon vehicle from any one of platoon vehicles of surrounding vehicles located in a region around the first vehicle, for example. When the identification information of the forward vehicle detected by the detection section and the identification information of the platoon vehicle received by the communication section match each other, the system discriminates the forward vehicle as a platoon vehicle, and executes a predetermined process.

CITATION LIST

Patent Literature

PTL 1
Japanese Patent Application Laid-Open No. 2013-131065

SUMMARY OF INVENTION

Technical Problem

In the system disclosed in PTL 1, when two forward vehicles run side by side, or when two forward vehicles swap the left and right positions, which of the two forward vehicles the identification information detected by the detection section belongs is unclear, and the accuracy of discriminating the platooning vehicle is disadvantageously reduced.

An object of the present disclosure is to provide a platoon vehicle discrimination apparatus and a vehicle that can increase the accuracy of discriminating the platooning vehicle.

Solution to Problem

To achieve the above-mentioned object, a platoon vehicle discrimination apparatus of an embodiment of the present disclosure is configured to discriminate a platoon vehicle candidate to be organized into a platoon with a first vehicle from among surrounding vehicles located in a region around the first vehicle, the platoon vehicle discrimination apparatus including: a storage section configured to store identification information of the first vehicle; an acquiring section configured to acquire, from the second vehicle that is any one of the surrounding vehicles, identification information of a third vehicle located in a region around the second vehicle and location information of the second vehicle with respect to the third vehicle, the identification information of the third vehicle being read by the second vehicle, the location information of the second vehicle being specified by the second vehicle; and a discrimination section configured to make a comparison between the identification information of the first vehicle stored in the storage section and the identification information of the third vehicle acquired by the acquiring section, and discriminate the second vehicle as the platoon vehicle candidate from among the surrounding vehicles on a basis of a result of the comparison and the location information of the second vehicle with respect to the third vehicle, the location information of the second vehicle being acquired by the acquiring section.

In addition, a vehicle of an embodiment of the present disclosure includes the above-mentioned platoon vehicle discrimination apparatus Advantageous Effects of Invention According to the present disclosure, it is possible to increase the accuracy of discriminating the platooning vehicle.

DESCRIPTION OF EMBODIMENTS

An embodiment of the present disclosure is described below with reference to the drawings.

Figure 1:
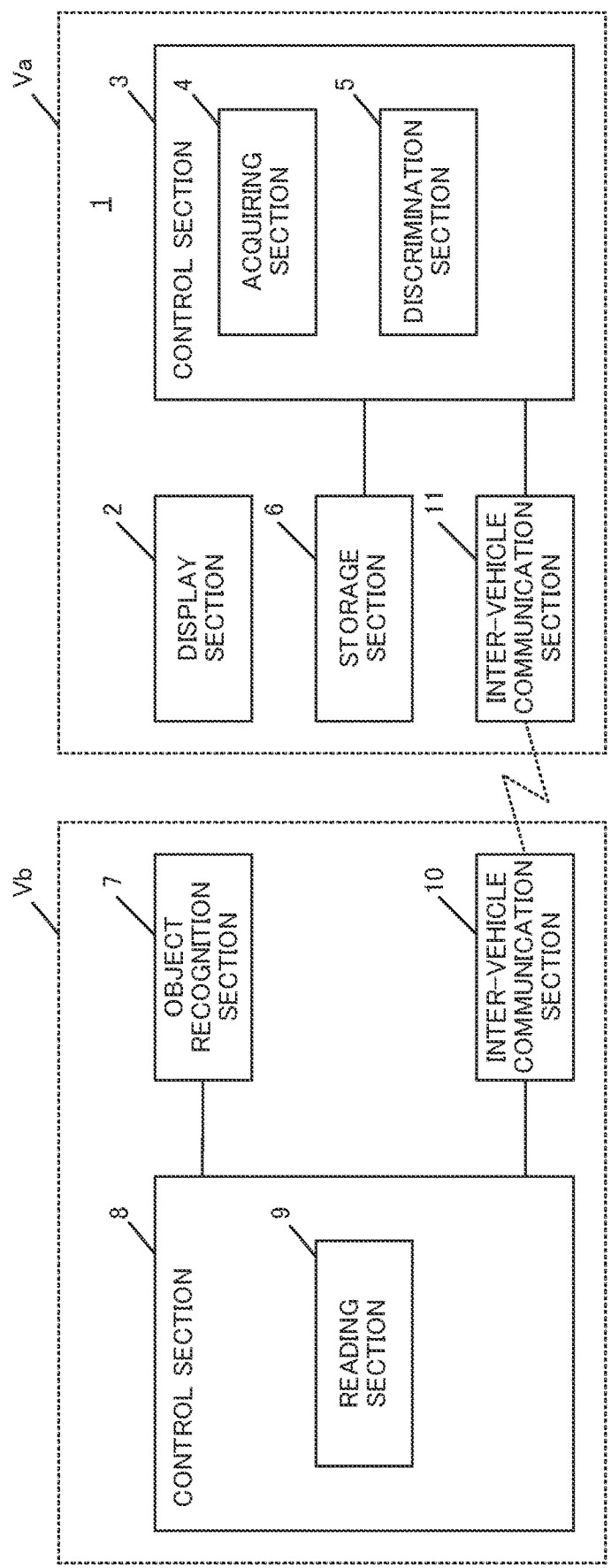
FIG. 1 is a control block diagram schematically illustrating a configuration of a platoon vehicle discrimination apparatus according to an embodiment of the present disclosure.

FIG. 1 is a control block diagram schematically illustrating a configuration of platoon vehicle discrimination apparatus 1 according to the embodiment of the present disclosure. As illustrated in FIG. 1, first vehicle Va includes platoon vehicle discrimination apparatus 1, display section 2, storage section 6, and inter-vehicle communication section 11.

Display section 2 displays identification information for identifying first vehicle Va. Display section 2 is disposed at a position where the image can be captured from the outside of first vehicle Va. More specifically, display section 2 is a license plate in which identification information is recorded. In the license plate, information representing a place name, classification information, Japanese-hiragana character information, and serial number are recorded. Note that the identification information is not limited to the license plate information as long as first vehicle Va can be identified. For example, the identification information may be a vehicle identification number (VIN).

Storage section 6 stores the identification information of first vehicle Va. Note that the identification information of first vehicle Va stored in storage section 6 is identical to the identification information of first vehicle Va displayed on display section 2.

Figure 2:
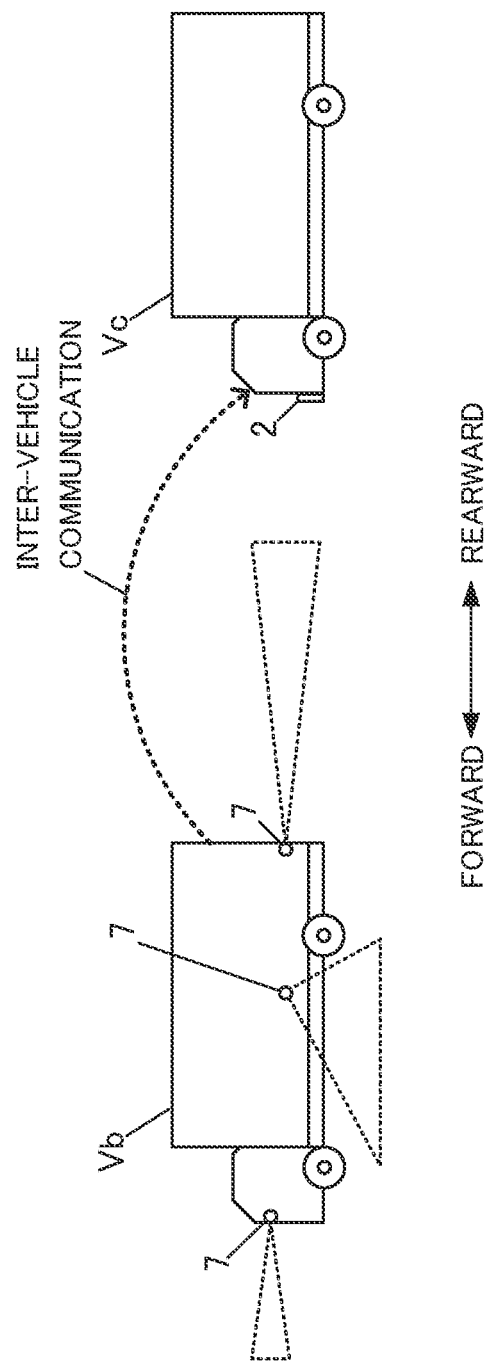
FIG. 2 schematically illustrates two vehicles travelling in a line in the front-rear direction.

FIG. 2 schematically illustrates two vehicles travelling in a line in the front-rear direction. One of surrounding vehicles in a region around first vehicle Va is referred to as vehicle second vehicle Vb, and is illustrated as a forward vehicle of two vehicles in FIG. 2. In addition, a vehicle travelling on the rear side of second vehicle Vb is referred to as third vehicle Vc, and is illustrated as a rearward vehicle of the two vehicles in FIG. 2. In addition, the identification information of third vehicle Vc is displayed on the display section (license plate) of third vehicle Vc. As illustrated in FIG. 1, second vehicle Vb includes object recognition section 7, control section 8, and inter-vehicle communication section 10.

Object recognition section 7 recognizes the position and the like of an object in a region around second vehicle Vb on the basis of information output from at least any of a camera, a finder, a radar apparatus and the like. Object recognition section 7 outputs a result of the recognition to control section 8.

The camera outputs data of captured images generated by capturing the images of the front, rear, and lateral sides of second vehicle Vb, for example. For example, the camera captures an image of third vehicle Vc located on the rear side of second vehicle Vb, and outputs captured image data of third vehicle Vc including the display section (license plate) to control section 8. As the camera, a known solid imaging device, such as a charge coupled device (CCD) image sensor and a complementary metal oxide semiconductor (CMOS) image sensor, is used, for example.

The finder detects the distance to the object by emitting light (irradiation light) to a region around second vehicle Vb and receiving scattering light scattered by the object, and outputs a detection result. As the finder, a light detection and ranging, laser imaging detection and ranging (LiDAR) is used, for example.

The radar apparatus detects at least the position (distance and orientation) of an object by emitting electromagnetic waves to a region around second vehicle Vb and receiving electromagnetic waves (reflection waves) reflected by the object, and outputs a detection result. Here, the radar apparatus detects the position of third vehicle Vc. From the detection result, the position (distance and orientation) of second vehicle Vb with respect to third vehicle Vc can be specified.

As illustrated in FIG. 1, control section 8 has a function as reading section 9. Reading section 9 reads identification information such as letters and numbers. Reading section 9 reads the identification information of third vehicle Vc recorded in the display section on the basis of data of the captured image of third vehicle Vc including the display section generated through image-capturing with the camera, for example.

Inter-vehicle communication section 10 is a communication apparatus configured to use a wireless radio wave of a predetermined frequency band and transmit and receive it between vehicles, and exchanges a variety of information related to the vehicle (hereinafter referred to as "vehicle information") between vehicles. The vehicle information includes vehicle control information, travelling states of surrounding vehicles, and the like. Here, inter-vehicle communication section 10 transmits, as vehicle information, the identification information of third vehicle Vc, and the location information (distance and orientation) of second vehicle Vb with respect to third vehicle Vc to inter-vehicle communication 11 of first vehicle Va.

Inter-vehicle communication section 11 sends, to platoon vehicle discrimination apparatus 1, the identification information of third vehicle Vc and the location information (distance and orientation) of second vehicle Vb with respect to third vehicle Vc sent from inter-vehicle communication section 10.

Platoon vehicle discrimination apparatus 1 includes control section 3. Control section 3 is composed of a microcomputer including a central processing unit (CPU), a read only memory (ROM), a random access memory (RAM), an input interface, and an output interface. The CPU reads a program corresponding to the processing from the ROM and loads it into the RAM, and, performs a centralized control of operations of each block and the like in cooperation with the loaded program.

Control section 3 has functions as acquiring section 4 and discrimination section 5. Note that these functions may be included in an electric control unit (ECU), which is an apparatus that uses an electronic circuit to control each system in a vehicle. In addition, some or all of these functions may be provided separately from the ECU.

Acquiring section 4 acquires the identification information of third vehicle Vc, and the location information (distance and orientation) of second vehicle Vb with respect to third vehicle Vc.

Discrimination section 5 compares the identification information of third vehicle Vc acquired by acquiring section 4 and the identification information of first vehicle Va stored in storage section 6. When the two pieces of identification information are identical to each other, discrimination section 5 discriminates second vehicle Vb located on the front side of first vehicle Va as a platoon vehicle candidate on the basis of the location information (distance and orientation) of second vehicle Vb with respect to first vehicle Va as third vehicle Vc (a vehicle whose identification information is read). On the other hand, when the two pieces of identification information are not identical to each other, discrimination section 5 terminates the process of discriminating the vehicle as a platoon vehicle candidate.

Figure 3:
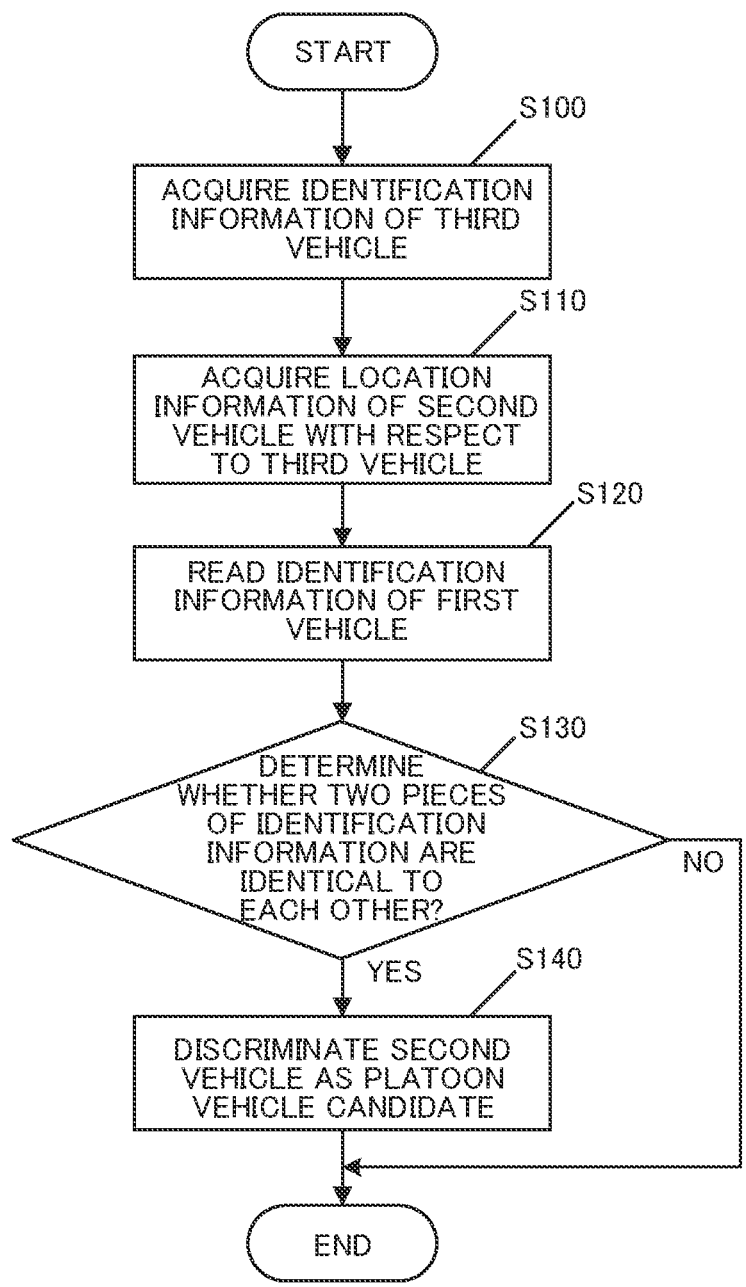
FIG. 3 is a flowchart of an exemplary platoon vehicle discriminating process operation according to the embodiment of the present disclosure.

Next, a platoon vehicle discriminating process operation of the present embodiment is described with reference to FIG. 3. FIG. 3 is a flowchart of an exemplary platoon vehicle discriminating process operation according to the embodiment of the present disclosure. The processing of the flowchart is appropriately started in first vehicle Va while first vehicle Va is travelling. Here, likewise, any one vehicle of surrounding vehicles around first vehicle Va is set as second vehicle Vb, and any one vehicle of surrounding vehicles around second vehicle Vb is set as third vehicle Vc.

First, at step S100, acquiring section 4 acquires the identification information of third vehicle Vc. In this example, acquiring section 4 receives the identification information of third vehicle Vc from second vehicle Vb through an inter-vehicle communication to acquire the identification information of third vehicle Vc.

Next, at step S110, acquiring section 4 acquires the location information of second vehicle Vb (distance and direction) with respect to third vehicle Vc. In this example, acquiring section 4 receives the location information of second vehicle Vb with respect to third vehicle Vc from second vehicle Vb through an inter-vehicle communication to acquire the location information of second vehicle Vb with respect to third vehicle Vc.

Next, at step S120, discrimination section 5 reads the identification information of first vehicle Va from storage section 6.

Next, at step S130, discrimination section 5 determines whether the two pieces of identification information are identical to each other. When the two pieces of identification information are identical to each other (step S130: YES), the process is advanced to step S140. On the other hand, when the two pieces of identification information are not identical to each other (step S130: NO), the process is terminated.

At step S140, discrimination section 5 discriminates second vehicle Vb as a platoon vehicle candidate. Thereafter, the process is terminated.

Note that the discrimination result of discrimination section 5 is output. First vehicle Va acquires unique information (such as the vehicle identification number and the license plate information) of second vehicle Vb as a platoon vehicle candidate through an inter-vehicle communication on the basis of the discrimination result output by discrimination section 5. Second vehicle Vb is determined as a platoon vehicle on the basis of the unique information thereof.

Platoon vehicle discrimination apparatus 1 according to the present embodiment is configured to discriminate a platoon vehicle candidate to be organized into a platoon with first vehicle Va from among surrounding vehicles located in a region around first vehicle Va, platoon vehicle discrimination apparatus 1 including: storage section 6 configured to store identification information of first vehicle Va; acquiring section 4 configured to acquire, from second vehicle Vb that is any one of the surrounding vehicles, identification information of a third vehicle Vc located in a region around second vehicle Vb and location information of second vehicle Vb with respect to third vehicle Vc, the identification information of third vehicle Vc being read by second vehicle Vb, the location information of second vehicle Vb being specified by second vehicle Vb; and discrimination section 5 configured to make a comparison between the identification information of first vehicle Va stored in the storage section 6 and the identification information of third vehicle Vc acquired by acquiring section 4, and discriminate second vehicle Vb as the platoon vehicle candidate from among the surrounding vehicles on a basis of a result of the comparison and the location information of second vehicle Vb with respect to third vehicle Vc, the location information of second vehicle Vb being acquired by acquiring section 4. In this manner, the own location information is transmitted from second vehicle Vb to first vehicle Va, and thus a situation where first vehicle Va mistakenly acquires the position of second vehicle Vb is avoided, and the accuracy of discrimination of second vehicle Vb as a platoon vehicle candidate can be increased.

In addition, second vehicle Vb transmits the own location information (the location information of second vehicle Vb with respect to third vehicle Vc) to first vehicle Va, and thus discrimination section 5 of first vehicle Va can discriminate second vehicle Vb as a platoon vehicle candidate even at a location such as a tunnel where the vehicle position cannot be positioned with a global positioning system (GPS).

Note that while the position (distance and orientation) of second vehicle Vb with respect to third vehicle Vc is specified based on the detection result of the radar apparatus in the present embodiment, the present disclosure is not limited to this. For example, it may be specified based on captured image data of the display section (license plate) generated through image-capturing with the camera.

In addition, in the present embodiment, the display section may display a two-dimensional code that is converted identification information such as a quick response (QR) code (registered trademark). The information included in the two-dimensional code may be a marker identification (ID), a unique ID of the vehicle, a common ID of the vehicle, a vehicle group ID, the destination, the password (signal) and a combination of the information. For example, the QR code is bonded to the vehicle body.

In addition, display section 2 may be a liquid crystal display, for example. In the case where a random ID is given to first vehicle Va when the starter switch of first vehicle Va is turned on, display section 2 may display the random ID.

Note that practically, first vehicle Va may have the same configuration as second vehicle Vb, and second vehicle Vb may have the same configuration as first vehicle Va. With such a configuration, even in the case where the vehicle on the front side of two vehicle is first vehicle Va and the vehicle on the rear side is second vehicle Vb, second vehicle Vb can discriminate first vehicle Va as a platoon vehicle candidate from among surrounding vehicles.

The above-mentioned embodiments are merely examples of the present disclosure, and the technical scope of the present disclosure should not be construed as limited by them. In other words, various modifications of the present disclosure may be made insofar as they are within the spirit and scope of the present disclosure.

This application is entitled to and claims the benefit of Japanese Patent Application No. 2018-163384 filed on Aug. 31, 2018, the disclosure each of which including the specification, drawings and abstract is incorporated herein by reference in its entirety.

INDUSTRIAL APPLICABILITY

The present disclosure is favorably utilized for a vehicle including a vehicle discrimination apparatus that requires higher discrimination accuracy for platooning vehicles.

REFERENCE SIGNS LIST

Va First vehicle
Vb Second vehicle
Vc Third vehicle
1 Platoon vehicle discrimination apparatus
2 Display section
3 Control section
4 Acquiring section
5 Discrimination section
7 Object recognition section
6 Storage section
8 Control section
9 Reading section
10 Inter-vehicle communication section
11 Inter-vehicle communication section

The invention claimed is:
1. A platoon vehicle discrimination apparatus configured to discriminate a platoon vehicle candidate to be organized into a platoon with a first vehicle from among surrounding vehicles located in a region around the first vehicle, the platoon vehicle discrimination apparatus comprising:
a storage section configured to store identification information of the first vehicle;
an acquiring section configured to acquire, from a second vehicle that is any one of the surrounding vehicles, identification information of a third vehicle located in a region around the second vehicle and location information of the second vehicle with respect to the third vehicle, the identification information of the third vehicle being read by the second vehicle, the location information of the second vehicle being specified by the second vehicle; and
a discrimination section configured to make a comparison between the identification information of the first vehicle stored in the storage section and the identification information of the third vehicle acquired by the acquiring section, and discriminate the second vehicle as the platoon vehicle candidate from among the surrounding vehicles on a basis of a result of the comparison and the location information of the second vehicle with respect to the third vehicle, the location information of the second vehicle being acquired by the acquiring section.

2. The platoon vehicle discrimination apparatus according to claim 1, wherein the acquiring section acquires the identification information of the third vehicle and the location information of the second vehicle with respect to the third vehicle through an inter-vehicle communication.

3. The platoon vehicle discrimination apparatus according to claim 1, wherein the identification information of the third vehicle is displayed on a display section provided in the third vehicle.

4. The platoon vehicle discrimination apparatus according to claim 3, wherein the identification information of the third vehicle read by the second vehicle is identification information read based on captured image data of the display section generated through image-capturing from the second vehicle side.

5. The platoon vehicle discrimination apparatus according to claim 3, wherein the location information of the second vehicle with respect to the third vehicle specified by the second vehicle is location information specified based on the captured image data of the display section.

6. A vehicle comprising the platoon vehicle discrimination apparatus according to claim 1.

* * * * *